(12) United States Patent
Nishioka

(10) Patent No.: US 6,765,632 B2
(45) Date of Patent: Jul. 20, 2004

(54) SPREAD ILLUMINATING APPARATUS WITH PROTECTION COVER

(75) Inventor: Akihisa Nishioka, Iwata-gun (JP)

(73) Assignee: Minebea Co., Ltd., Nagano (JP)

(*) Notice: Subject to any disclaimer, the term of this patent is extended or adjusted under 35 U.S.C. 154(b) by 51 days.

(21) Appl. No.: 10/212,100

(22) Filed: Aug. 6, 2002

(65) Prior Publication Data

US 2003/0030763 A1 Feb. 13, 2003

(30) Foreign Application Priority Data

Aug. 10, 2001 (JP) ........................................ 2001-244046

(51) Int. Cl.[7] ............................................ G02F 1/1335
(52) U.S. Cl. ................................................ 349/61; 349/62
(58) Field of Search ................................ 349/14, 61, 62, 349/63, 64, 65, 66, 67

(56) References Cited

U.S. PATENT DOCUMENTS

| 5,808,707 A | * | 9/1998 | Niibori et al. ............... 349/60 |
| 6,204,898 B1 | * | 3/2001 | Maeda ........................ 349/63 |
| 6,309,081 B1 | * | 10/2001 | Furihata ...................... 362/31 |
| 6,603,519 B2 | * | 8/2003 | Fukiharu ..................... 349/63 |

FOREIGN PATENT DOCUMENTS

JP   A 2001-27122   1/2001

OTHER PUBLICATIONS

American Heritage Dictionary. 2000 Ed.. "Polycarbonate".*

* cited by examiner

*Primary Examiner*—Daniel A. Hess
(74) *Attorney, Agent, or Firm*—Oliff & Berridge, PLC

(57) ABSTRACT

A cover made of a light-transmissible material and adapted to cover a top surface of a light reflection pattern and an outside surface of a housing is attached on a frame-like plate, that is a part of a casing of a display product such as a cellular phone. Even if the frame-like plate is detached during or after the spread illuminating apparatus is mounted on the product, dusts or foreign materials are prevented from getting stuck to the light reflection pattern, or getting in the gap between the light conductive plate and the housing, or other component members are prevented from damaging the top surface of the light reflection pattern or the outside surface of the housing. These preventions or protections can be ensured by only one single cover, thereby simplifying the configuration of the apparatus.

6 Claims, 4 Drawing Sheets

SPREAD ILLUMINATING APPARATUS WITH PROTECTION COVER

BACKGROUND OF THE INVENTION

1. Field of the Invention

The present invention relates to a spread illuminating apparatus, and more particularly to a spread illuminating apparatus used as an illuminating means for a liquid crystal display.

2. Description of the Related Art

A liquid crystal display (hereinafter referred to as "LCD") featuring low profile and light weight as well as low power consumption has been extensively used in electric products including cellular phones and personal computers, and the demand for the LCD has been increasing. However, since a liquid crystal which is a structural element of the LCD does not emit light by itself unlike a light emitting element such as a CRT, the LCD requires a separate illuminating means for irradiating the LCD to obsess: an image. In particular, to satisfy a recent demand for downsizing, a sheet-like spread illuminating apparatus of side light type (light conductive plate type) is often used. As an example of a spread illuminating apparatus of side light type, an apparatus proposed by the present applicant was disclosed in Japanese Patent Application No. 2001-027122.

As shown in FIG. 5, a spread illuminating apparatus 1 generally comprises a light conductive plate 2 made of a light-transmissible material and a bar-like lamp 4 disposed along and close to a side surface 3 of the light conductive plate 2. In the spread illuminating apparatus 1 which is a front lighting system as an auxiliary lighting device, light emitted from the lamp 4 is guided into light conductive plate 2 and irradiates an LCD (not shown) disposed under the light conductive plate 2. The lamp 4 is generally composed of a light conductive bar 5 made of a transparent material and disposed along and close to the side surface 3 of the light conductive plate 2, spot-like light sources 6 and 7 arranged to face end surfaces 5a and 5b of the light conductive bar 5, respectively, and a light reflection member 23.

A light reflection pattern 8 is formed on one major surface (hereinafter referred to as "top surface") of the light conductive plate 2. A light reflection pattern cover 9 is disposed over the top surface of the light conductive plate 2 with a connecting member (not shown) provided therebetween so as to cover the light reflection pattern 8. The connecting member is shaped like a rim corresponding to the periphery of the light conductive plate 2. A cushioning material (not shown) made of a gel or liquid transparent substance is inserted between the light conductive plate 2 and the light reflection pattern cover 9 and along the inside of the connecting member.

The spread illuminating apparatus 1 of FIG. 5 is provided with the light reflection pattern cover 9 thereby keeping dust out of the light reflection pattern 8 and also preventing damage to the surface of the light conductive plate 2.

The light conductive plate and the lamp of the spread illuminating apparatus 1 are integrally enclosed in a picture frame-like housing made of, for example, a resin material, to be set in a cellular phone or the like.

By providing the light reflection pattern cover 9 over the top surface of the light conductive plate 2, the light reflection pattern 8 can be completely dust-free as described above. However, because the light reflection pattern cover is desired to be small to a minimum in thickness to reduce the thickness of the spread illuminating apparatus as a whole, the surface of the light conductive plate may not always be sufficiently protected against an impact from tie outside. In addition, a good-quality cushioning material with a lower refractive index than that of the light conductive plate 2 is not easily available, inevitably pushing up cost.

A frame-like plate, which is a display side part of a casing of a display product such as a cellular phone, has a transparent cover (hereinafter referred to as "viewing area cover") positioned over the spread illuminating apparatus 1, to be specific, over the light reflection pattern cover 9. This viewing area cover prevents dust from getting in the casing. It is a general practice to provide the viewing area cover in order to protect the spread illuminating apparatus mounted on the display product.

In the spread illuminating apparatus 1, however, when the frame-like plate of the display product is detached during or after mounting the apparatus 1 (the frame-like plate can be detached by the user in some products), the top surface of the spread illuminating apparatus 1 is exposed, so that dusts or foreign materials may get in a gap between the light conductive plate 2 and the housing 27, or may cause damage to the outside surface of the housing.

SUMMARY OF THE INVENTION

The present invention has been made in light of the above, and its object is to provide a spread illuminating apparatus which can prevent dusts or foreign materials from getting stuck to or damaging not only the surface of a light reflection pattern formed on a light conductive plate but also the surfaces of other components, and which is still less expensive and smaller in thickness than a conventional spread illuminating apparatus.

In a spread illuminating apparatus according to the present invention, which comprises a regular light conductive plate having a light reflection pattern on one major surface thereof, a bar-like lamp disposed at at least one side surface of the light conductive plate, and a housing adapted to hold together the light conductive plate and the lamp, which constitutes, together with a liquid crystal display, a display product, and which is disposed in front of a liquid crystal display panel, a cover made of a light-transmissible material and adapted to cover a top surface of the light conductive plate and a surface of the amp is fixed to the housing so as to concurrently serve as a viewing area cover conventionally supposed to be attached on a casing of the display product.

In the spread illuminating apparatus according to the present invention, the cover is made of an acrylic resin or a glass material.

In the spread illuminating apparatus according to the present invention, the cover is fixed to the housing with an adhesive double coated tape.

DESCRIPTION OF THE PREFERRED EMBODIMENTS

Figure 5:
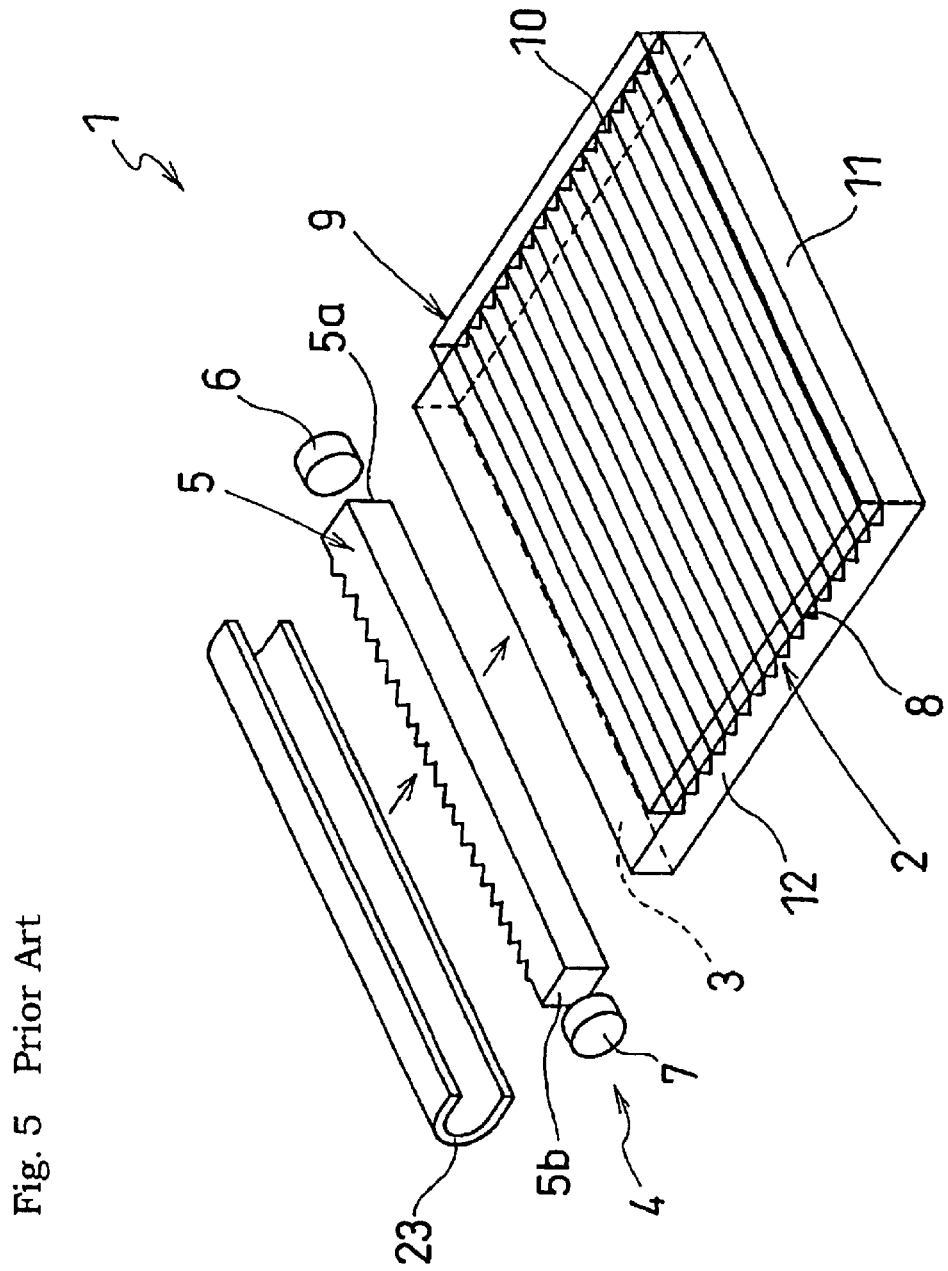
FIG. 5 is an exploded perspective view showing an example of a conventional spread illuminating apparatus.

A spread illuminating apparatus according to a first embodiment of the present invention will be explained with reference to FIGS. 1 to 4. Parts and members similar to those in FIG. 5 are denoted by the same reference numerals and a description thereof will be omitted unless necessary.

Figure 1:
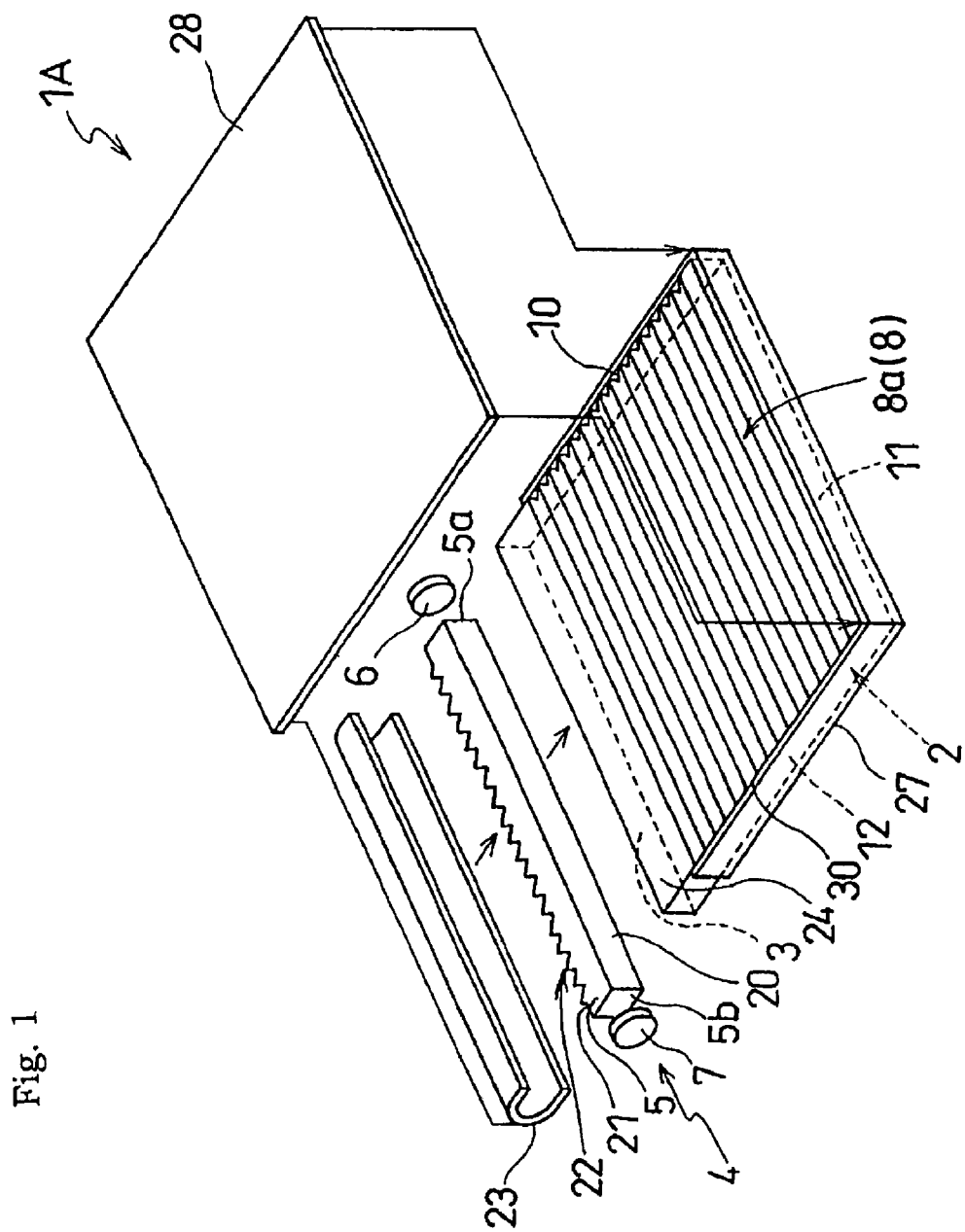
FIG. 1 is an exploded perspective view showing a spread illuminating apparatus according to an embodiment of the present invention.
Figure 2:
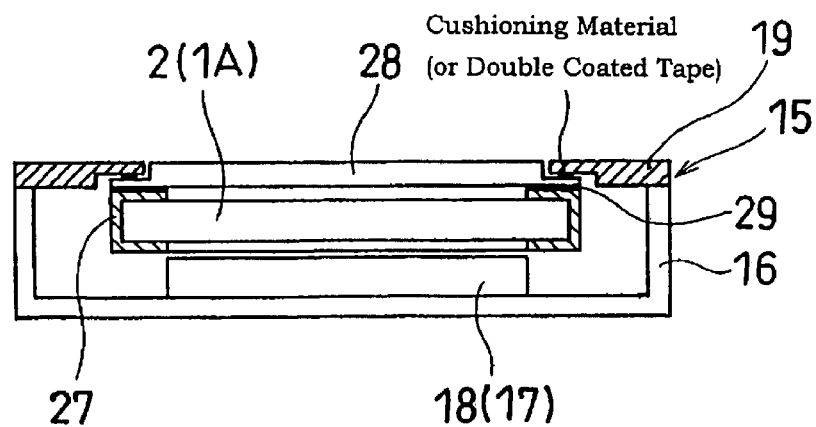
FIG. 2 is a schematic sectional view showing how the spread illuminating apparatus of FIG. 1 is mounted on a cellular phone.

As shown in FIGS. 1 and 2, a spread illuminating apparatus 1A is enclosed together with a liquid crystal display (thereinafter referred to as "LCD") 17 in a casing 16 of a cellular phone 15 so as to be disposed in front of a liquid crystal display panel (LCD panel) 18 (screen) of the LCD 17. The casing 16 has a frame-like plate 19 attached thereto in front of the spread illuminating apparatus 1A. It may be that the frame-like plate 19 can be detached by the user or cannot.

The spread illuminating apparatus 1A is generally composed of a light conductive plate 2 made of a light-transmissible material and a bar-like lamp 4 disposed close to a side surface 3 of the light conductive plate 2. The LCD panel 18 is disposed under a bottom surface of the light conductive plate 2. The spread illuminating apparatus 1A emits light (not shown) on a front side (upper side in FIG. 2) of the LCD panel 18, and guides light reflected from the LCD panel 18 to the front side (upper side in FIG. 2), thus functioning as a front light system, so that the user can observe an image on the LCD panel 18.

The lamp 4 is generally composed of a light conductive bar 5 made of a transparent material disposed along and close to the side surface 3 of the light conductive plate 2, and spot-like light sources 6 and 7, such as a light emitting diode (LED), arranged to face end surfaces 5a and 5b of the light conductive bar 5, respectively.

In this connection, the lamp 4 may have only one spot-like light source arranged at one end of the light conductive bar 5, and may have a plurality of light conductive bars 5.

The light conductive bar 5 has an optical path conversion means 22 on a surface 21 opposite to a surface 20 facing the light conductive plate 2 to uniformly spread light emitted from the spot-like light sources 6 and 7 through the surface 20. Also, a light reflection member 23 is arranged to enclose the light conductive bar 5. The light reflection member 23 is made of a metal plate bent in substantially U-shape, and has, on its inner surface, a film (not shown) having a metal such as a silver evaporated thereon so as to efficiently reflect light radiated from the light conductive bar 5.

In this embodiment, the light reflection member 23 extends up to a portion 24 of the light conductive plate 2 so as to sandwich the portion 24, thereby holding together the light conductive bar 5 and the light conductive plate 2.

Figure 3:
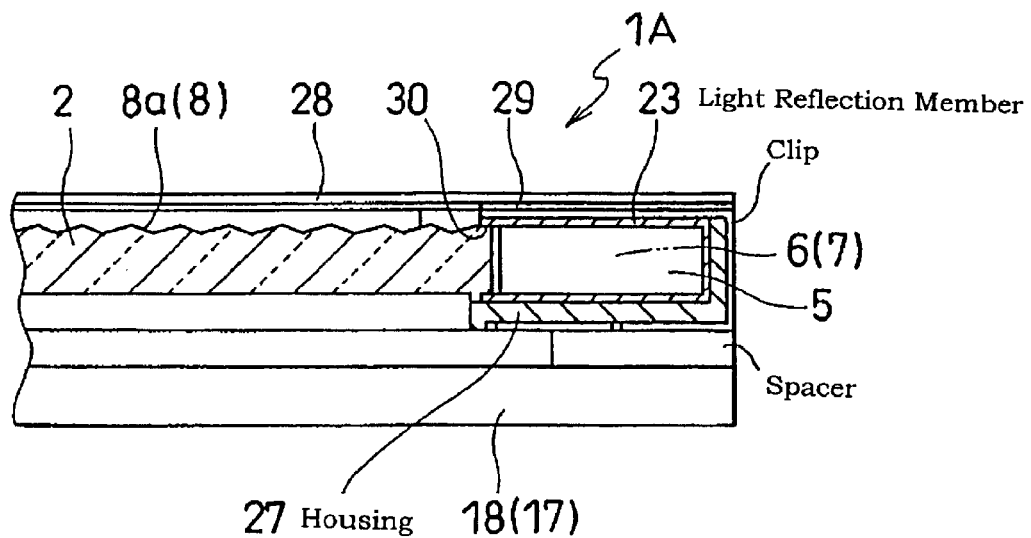
FIG. 3 is a schematic view showing how a cover is attached to a light conductive plate and a housing of FIG. 1.
Figure 4:
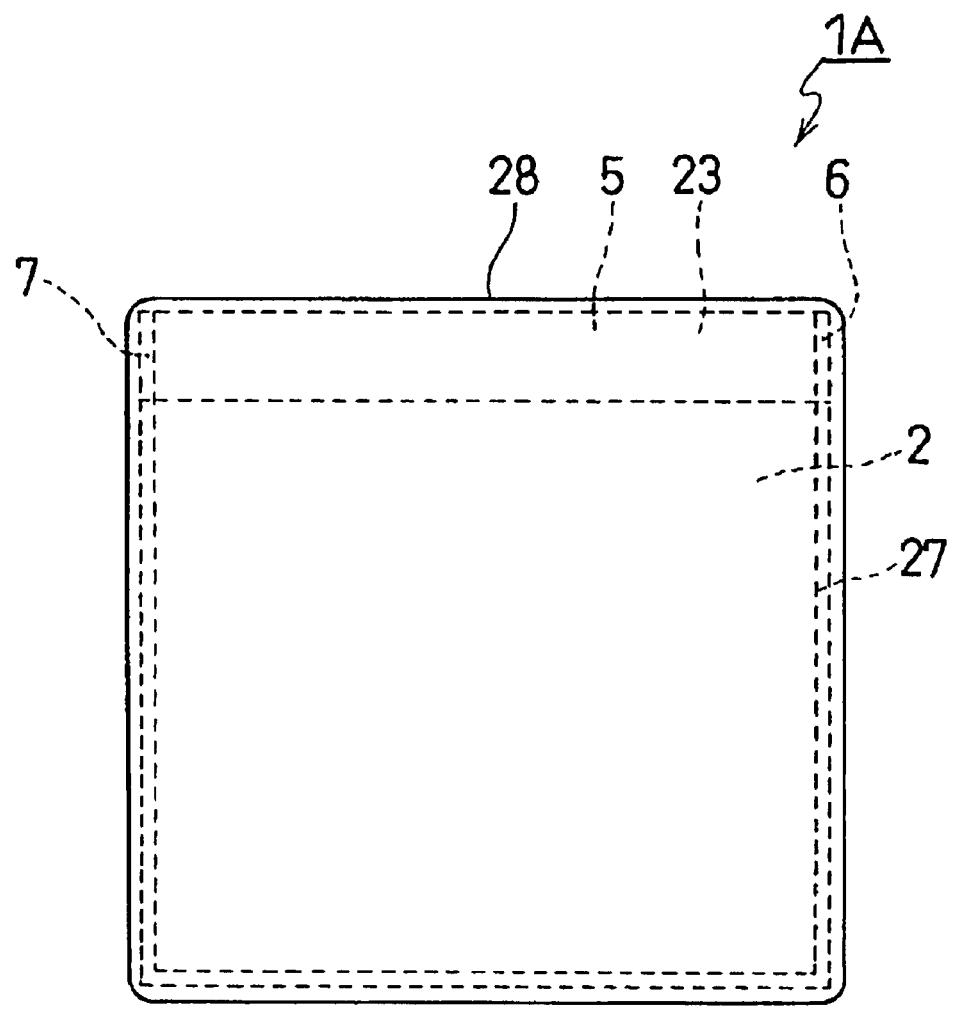
FIG. 4 is a schematic plan view showing the spread illuminating apparatus of FIG. 1.

As shown in FIGS. 1 and 3, the light conductive plate 2 has a light reflection pattern 8 (prism surface) formed on one major surface thereof (upper side in FIG. 1 in this embodiment and hereinafter referred to as "top surface") and comprising a plurality of grooves 8a triangular in section. The plurality of grooves 8a extend in parallel to or at a fixed angle with the lift conductive bar 5 and are formed from the side surface 3 toward the other side surface 11 opposite to the side surface 3.

The spread illuminating apparatus 1A is provided with a frame-like housing 27 adapted to enclose the light conductive plate 2 and the lamp 4 therein, and is arranged in front of the LCD 17, specifically the LCD panel 18. The housing 27 serves to mount parts (not shown) on and to support the casing 16 of the cellular phone 15.

The spread illuminating apparatus 1A further includes a rectangular cover 28 for cove the top surface of the light conductive plate 2 and one surface of the lamp 4, as shown in FIGS. 1 to 4. The cover 28 is made of a transparent acryl resin and fixed to the housing 27 with an adhesive double coated tape 29. The cover 28 is structured and arranged so as to concurrently serve as a viewing area cover conventionally supposed to be attached on the cellular phone 15. In order to allow the user to detach the frame-like plate 19, the outside periphery of the cover 28 is firmly held (not permanently fixed) to the inside periphery of the frame-like plate 19 with a cushioning material disposed therebetween. When the user is not allowed to detach the frame-like plate 19, the cover 28 and the frame-like plate 19 may be permanently fixed to each other with the adhesive double coated tape 29. In this connection, any cushioning material and any adhesive double coated tape may be used as long as dusts or foreign materials are prevented from getting in the casing.

Since the spread illuminating apparatus 1A according to the present invention is provided with the cover 28 as described above, dusts or foreign materials are surely prevented from getting stuck to the light reflection pattern 8 or getting in a gap 30 between the light conductive plate 2 and the housing 27 when the spread illuminating apparatus 1A is mounted on the cellular phone 15. Furthermore, the cover 28 prevents other members from damaging the surfaces of the light reflection pattern 8 and the housing 27.

Also, since the spread illuminating apparatus 1A is provided with the cover 28, dusts or foreign materials are prevented from getting stuck to the light reflection pattern 8 or getting in the gap 30, or damaging the surfaces of the light reflection pattern 8 and the housing 27 even if the frame-like plate 19, which is a display side part of a casing of the cellular phone 15, is detached after the spread illuminating apparatus 1A is mounted on the cellular phone 15.

In the aforementioned conventional art, in order to prevent dusts or foreign materials from getting stuck to the light reflection pattern 8, getting in the gap 30 between the light conductive plate 2 and the housing 27, or dig the light reflection pattern 8, two covers, namely the light reflection patter cover 9 and the viewing area cover, are required. In the present embodiment, however, since the above-mentioned preventions and protections can be equally achieved by only one single cover 28, the number of parts can be deceased, thereby downsizing and simplifying the apparatus.

In the above embodiment, the cover 28 is made of an acrylic resin, but may alternatively be made of other materials such as a transparent glass material and polyethylene telephthalate (PET). Also, the cover 28 may have an AR coating on at least one of both side surfaces.

Also, in the above embodiment, the cover 28 is fixed to the housing 27 and the frame-like plate 19 using the adhesive double coated tape 29, but an adhesive may alternatively be used. And, the cover and the housing may be integrally formed of a light-transmissible material.

The housing 27 is composed of one piece frame-shaped member, but may alternatively be composed of long and narrow plate-like members or substantially L-shaped members.

What is claimed is:

1. A spread illuminating apparatus comprising:

a rectangular light conductive plate having a light reflection pattern on one major surface thereof;

a bar-like lamp disposed to face at lest one side surface of said light conductive plate; and a housing adapted to hold together said light conductive plate and said lamp, said apparatus, together with a liquid crystal display, constituting a display product and disposed in front of a liquid crystal display panel, wherein a cover made of a light-transmissible material and adapted to cover a top surface of said light conductive plate and a surface of said lamp which is fixed to said housing such that said cover concurrently serves as a viewing area cover of said display product supposed to be attached on a casing of said display product.

2. A spread illuminating apparatus as claimed in claim 1, wherein said cover is made of an acrylic resin or a glass material.

3. A spread illuminating apparatus as claimed in claim 1, wherein said cover is fixed to said housing with an adhesive double coated tape.

4. A spread illuminating apparatus as claimed in claim 2, wherein said cover is fixed to said housing with an adhesive double coated tape.

5. A spread illuminating apparatus as claimed in claim 1, wherein the cover is adapted to cover a surface of a light reflection member.

6. A spread illuminating apparatus as claimed in claim 1, wherein said lamp includes a light reflection member.

* * * * *